(12) United States Patent
Kim et al.

(10) Patent No.: US 9,294,948 B2
(45) Date of Patent: Mar. 22, 2016

(54) METHOD FOR MEASURING INTERFERENCE STRENGTH IN WIRELESS COMMUNICATION SYSTEM AND DEVICE THEREFOR

(71) Applicant: LG ELECTRONICS INC., Seoul (KR)

(72) Inventors: Hyungtae Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/378,298

(22) PCT Filed: Mar. 22, 2013

(86) PCT No.: PCT/KR2013/002405
§ 371 (c)(1),
(2) Date: Aug. 12, 2014

(87) PCT Pub. No.: WO2013/141652
PCT Pub. Date: Sep. 26, 2013

(65) Prior Publication Data
US 2015/0017927 A1    Jan. 15, 2015

Related U.S. Application Data

(60) Provisional application No. 61/614,471, filed on Mar. 22, 2012.

(51) Int. Cl.
*H04W 24/08* (2009.01)
*H04B 17/345* (2015.01)
*H04B 17/318* (2015.01)

(52) U.S. Cl.
CPC ............. *H04W 24/08* (2013.01); *H04B 17/318* (2015.01); *H04B 17/345* (2015.01)

(58) Field of Classification Search
None
See application file for complete search history.

(56) References Cited

U.S. PATENT DOCUMENTS

| | | | |
|---|---|---|---|
| 8,838,164 B2 * | 9/2014 | Koo et al. | 455/522 |
| 2009/0233594 A1 | 9/2009 | Duschesne et al. | |
| 2010/0208600 A1 | 8/2010 | Persson | |
| 2010/0214941 A1 | 8/2010 | Hoole | |
| 2010/0216497 A1 | 8/2010 | Kawasaki | |
| 2011/0045856 A1 | 2/2011 | Feng et al. | |
| 2011/0249642 A1 | 10/2011 | Song et al. | |

OTHER PUBLICATIONS

PCT International Application No. PCT/KR2013/002405, Written Opinion of the International Searching Authority dated Jul. 8, 2013, 17 pages.
PCT International Application No. PCT/KR2013/002405, Written Opinion of the International Searching Authority dated Jul. 8, 2013, 1 page.

* cited by examiner

*Primary Examiner* — Philip Sobutka
(74) *Attorney, Agent, or Firm* — Lee, Hong, Degerman, Kang & Waimey

(57) ABSTRACT

The present invention relates to a wireless communication system and, more particularly, to a method for enabling a terminal to measure the strength of an interference signal in a wireless communication system and a device therefor, wherein the method comprises the steps of: measuring a first interference strength, which is the strength of an interference signal received from a first base station group; calculating a second interference strength, which is the strength of an interference signal received from a second base station group; and correcting the first interference strength on the basis of the second interference strength.

18 Claims, 16 Drawing Sheets

FIG. 2
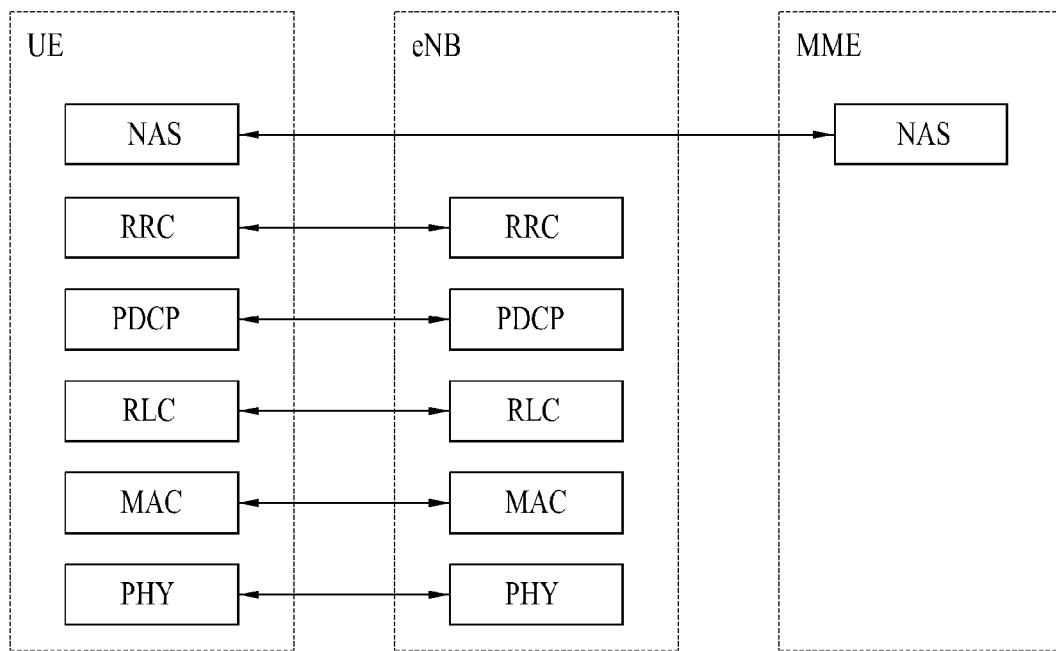
(a) control plane protocol stack
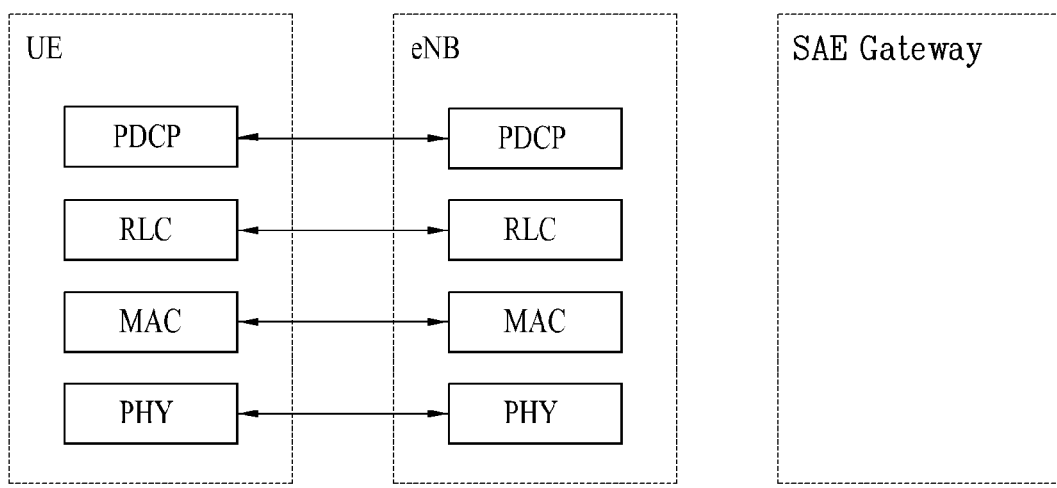
(b) user plane protocol stack

FIG. 11A
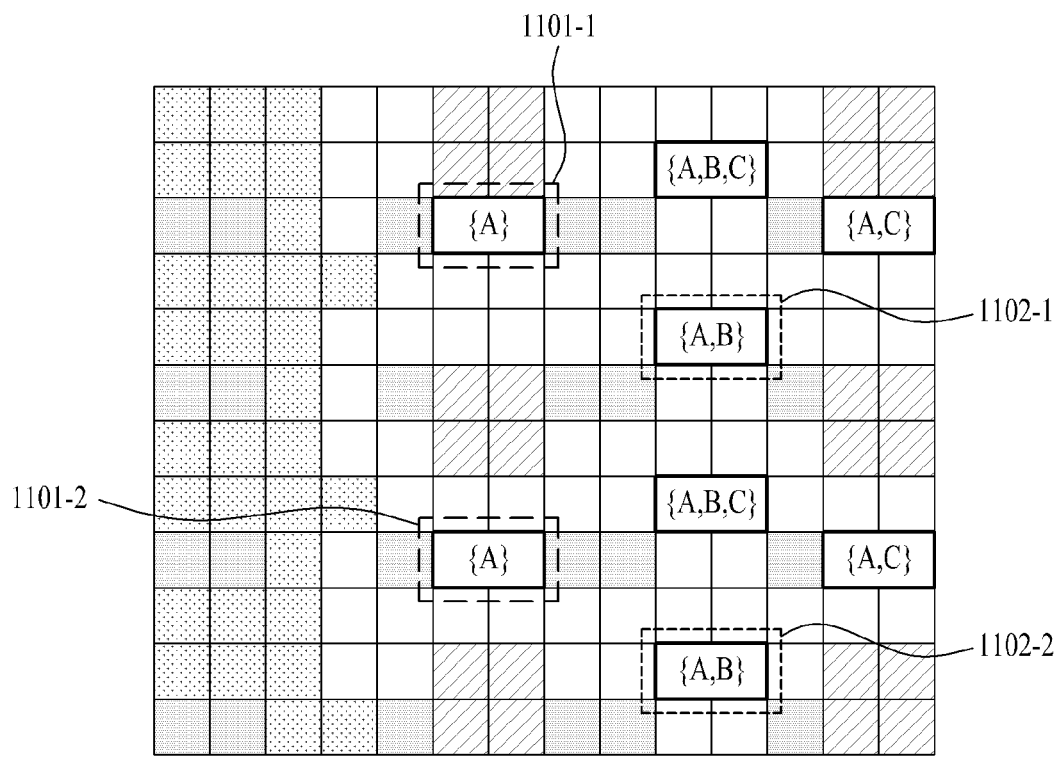
Muting resources of point A
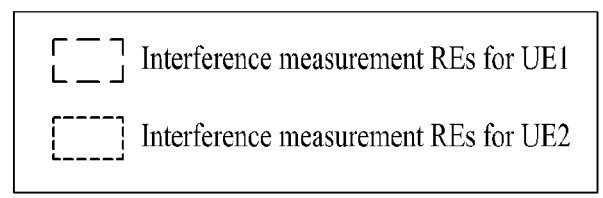

Muting resources of point A

FIG. 12

Table comparing UE-specific interference measurement zone with cell-specific interference measurement zone

|  | UE-specific interference measurement zone | Cell-specific interference measurement zone |
|---|---|---|
| advantage | • Not need to separately correct result<br>• Applicable to various scenarios | • Resource use for muting is not big<br>• Similarly, applicable to various scenarios |
| disadvantage | • Resource overhead may occur for muting | • Need to separately correct result |

METHOD FOR MEASURING INTERFERENCE STRENGTH IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/002405, filed on Mar. 22, 2013, which claims the benefit of U.S. Provisional Application Ser. No. 61/614,471, filed on Mar. 22, 2012, the contents of which are all hereby incorporated by reference herein in their entirety.

TECHNICAL FIELD

The present invention relates to a wireless communication system, and more particularly, to a method of measuring interference strength in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

In order to support efficient management of a wireless communication system of a base station, a user equipment periodically and/or aperiodically reports state information of a current channel to the base station. As mentioned in the foregoing description, the information on the channel state feedback by the user equipment is called channel state information (CSI). In calculating the channel state information, the user equipment should consider not only an interference signal of the base station with which a data is transceived but also an interference signal of a different base station. Hence, it is necessary to have a method of precisely measuring strength of the interference signal from the different base station.

DISCLOSURE OF THE INVENTION

Technical Task

Accordingly, the present invention intends to propose a method of measuring interference strength in a wireless communication system and apparatus therefor in the following description based on the discussion as mentioned in the foregoing description.

Technical Solution

To achieve these and other advantages and in accordance with the purpose of the present invention, as embodied and broadly described, according to one embodiment, a method of measuring strength of an interference signal, which is measured by a user equipment in a wireless communication system includes the steps of measuring first interference strength corresponding to the strength of the interference signal received from a first base station group, calculating second interference strength corresponding to the strength of the interference signal received from a second base station group and correcting the first interference strength based on the second interference strength.

Preferably, the method of measuring the strength of the interference signal can further include the step of receiving correction type indication information indicating either a correction of subtracting the second interference strength from the first interference strength or a correction of adding the second interference strength to the first interference strength from a network.

In the method, if the second base station group belongs to the first base station group, the correction type indication information can indicate the correction of subtracting the second interference strength from the first interference strength.

In the method, if the second base station group does not belong to the first base station group, the correction type indication information can indicate the correction of adding the second interference strength to the first interference strength.

Preferably, the step of measuring the first interference strength can be performed on an RE (resource element) which is configured to measure interference of the first base station group.

Moreover, the RE configured to measure the interference of the first base station group may correspond to an RE in which one or more base stations including the first base station perform muting.

And, the step of calculating the second interference strength can include the steps of receiving an RS (reference signal) from the base station and measuring strength of the received RS.

And, the step of calculating the second interference strength can include the steps of further receiving a PDSCH (physical downlink shared channel) to RS power ratio information from the base station and calculating the second interference strength based on the received power ratio information and the strength of the measured RS.

And, the step of calculating the second interference strength can include the steps of further receiving a rank of a data received from the base station and PMI (precoding matrix index) information, calculating a size of an interference effective channel based on the strength of the measured RS and the received rank and PMI information and calculating the second interference strength based on the size of the interference effective channel.

And, the step of calculating the second interference strength can include the steps of further receiving traffic load information of the base station from the base station and calculating the second interference strength based on the strength of the measured RS and the traffic load information.

To further achieve these and other advantages and in accordance with the purpose of the present invention, according to a different embodiment, a user equipment measuring strength of an interference signal in a wireless communication system includes a wireless communication module configured to transceive a signal with base stations and a processor configured to access the wireless communication module and configured to control an operation of the user equipment, the processor configured to measure first interference strength corresponding to the strength of the interference signal received from a first base station group, the processor configured to calculate second interference strength corresponding to the strength of the interference signal received from a second base station group, the processor configured to correct the first interference strength based on the second interference strength.

Advantageous Effects

According to embodiments of the present invention, it is able to precisely measure or correct strength of an interference signal received from not only a base station with which a data is transceived but also a different base station in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 11a is a diagram for first example of configuring a UE-specific interference measurement zone among resource region received from each TP;

FIG. 12 is a table summarizing pros and cons for a scheme of a UE-specific interference measurement zone and a scheme of a cell-specific interference measurement zone;

BEST MODE

Mode for Invention

Figure 1:
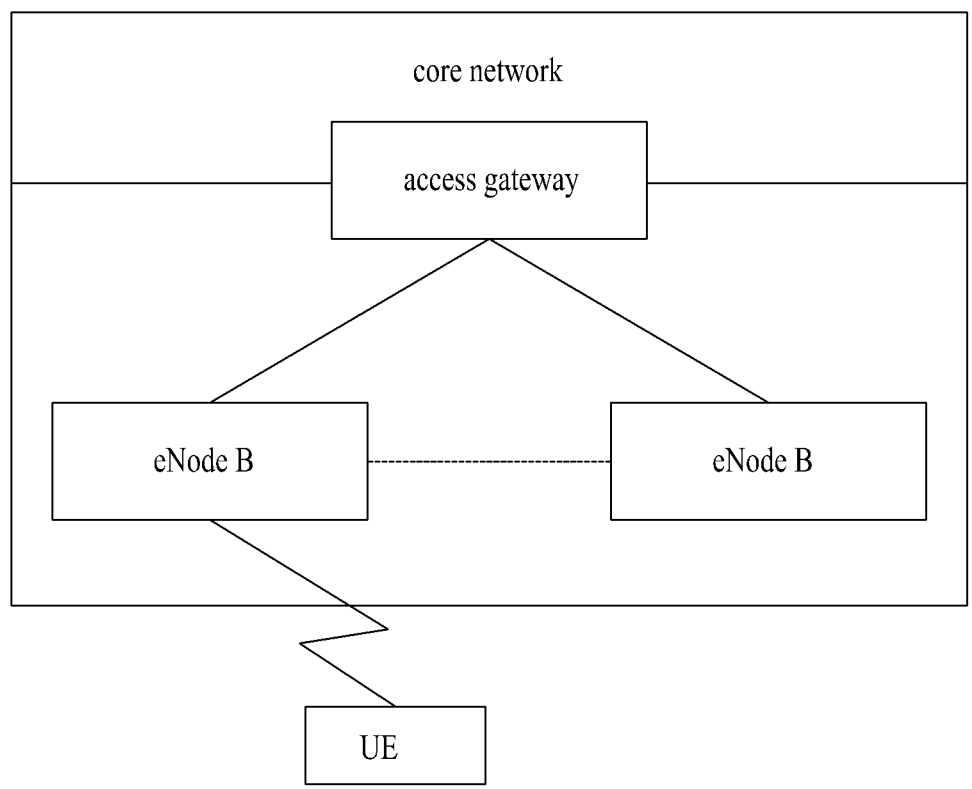
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1$^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2$^{nd}$ layer provides a service to a radio link control (hereinafter abbreviated RLC) layer, which is a higher layer, on a logical channel. The RLC layer of the 2$^{nd}$ layer supports a reliable data transmission. The function of the RLC layer may be implemented by a function block within the MAC. PDCP (packet data convergence protocol) layer of the 2$^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3$^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2$^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
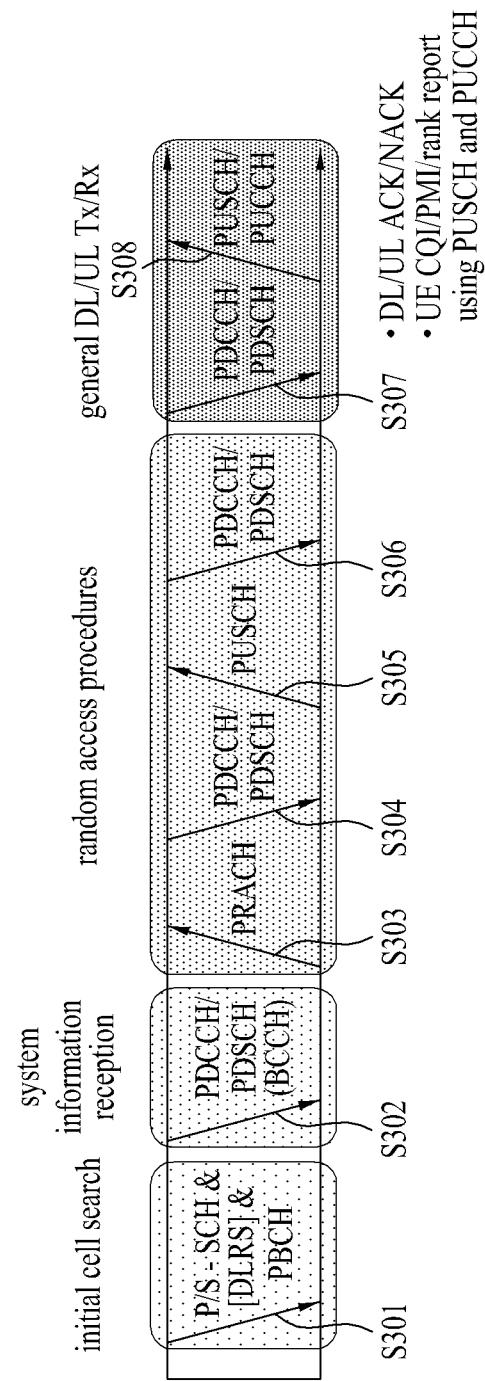
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
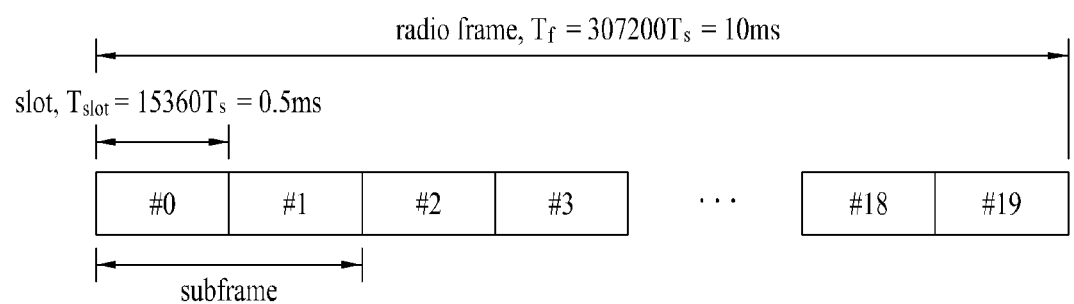
FIG. 4 is a diagram for a structure of a radio frame in LTE system.

FIG. 4 is a diagram for a structure of a radio frame used in an LTE system.

Referring to FIG. 4, one radio frame has a length of 10 ms (327,200×$T_S$) and is constructed with 10 subframes in equal size. Each of the subframes has a length of 1 ms and is constructed with two slots. Each of the slots has a length of 0.5 ms (15,360×$T_S$). In this case, $T_s$ indicates a sampling time and is represented as $T_s$=1/(15 kHz×2048)=3.2552×10$^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
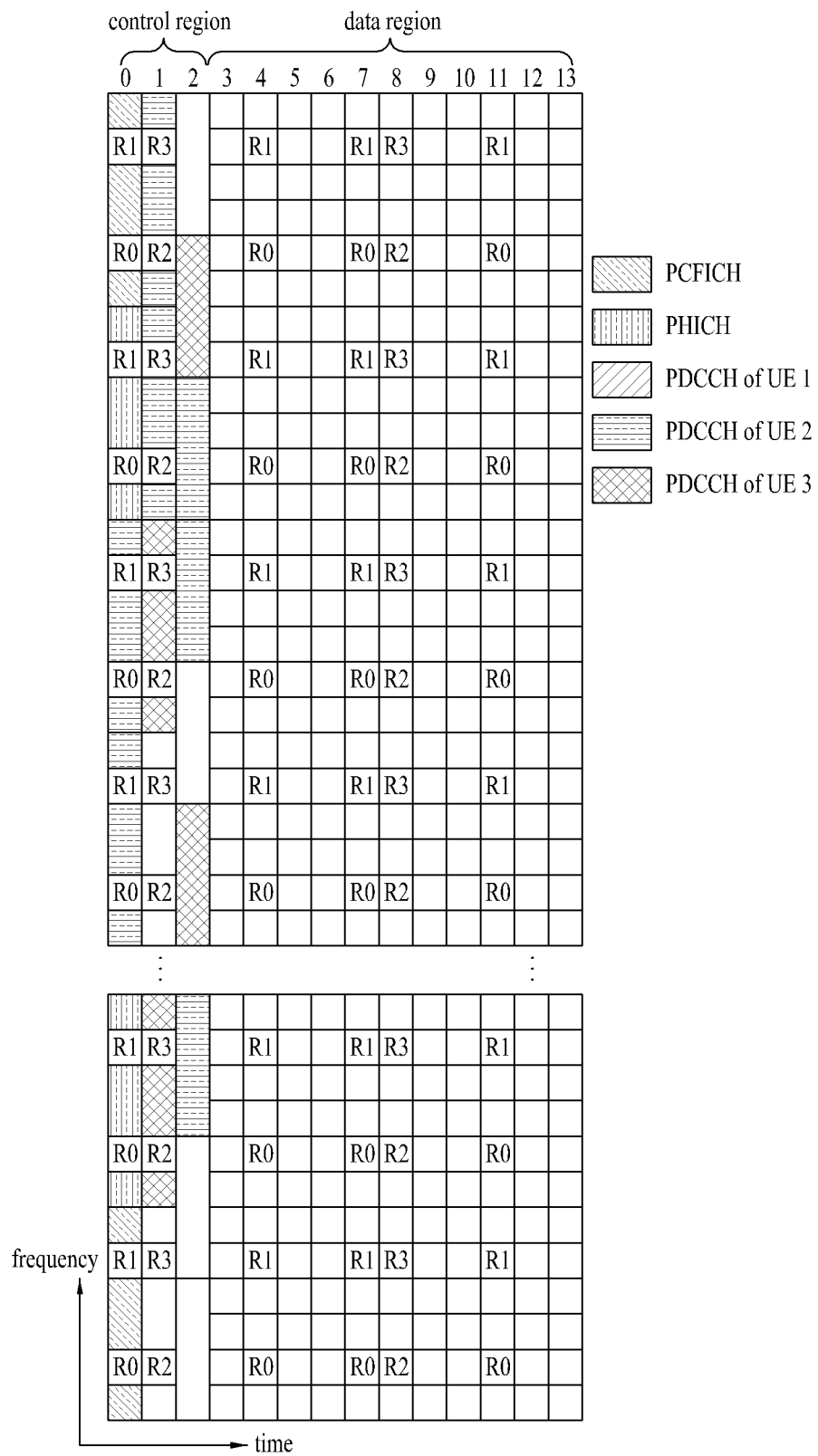
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
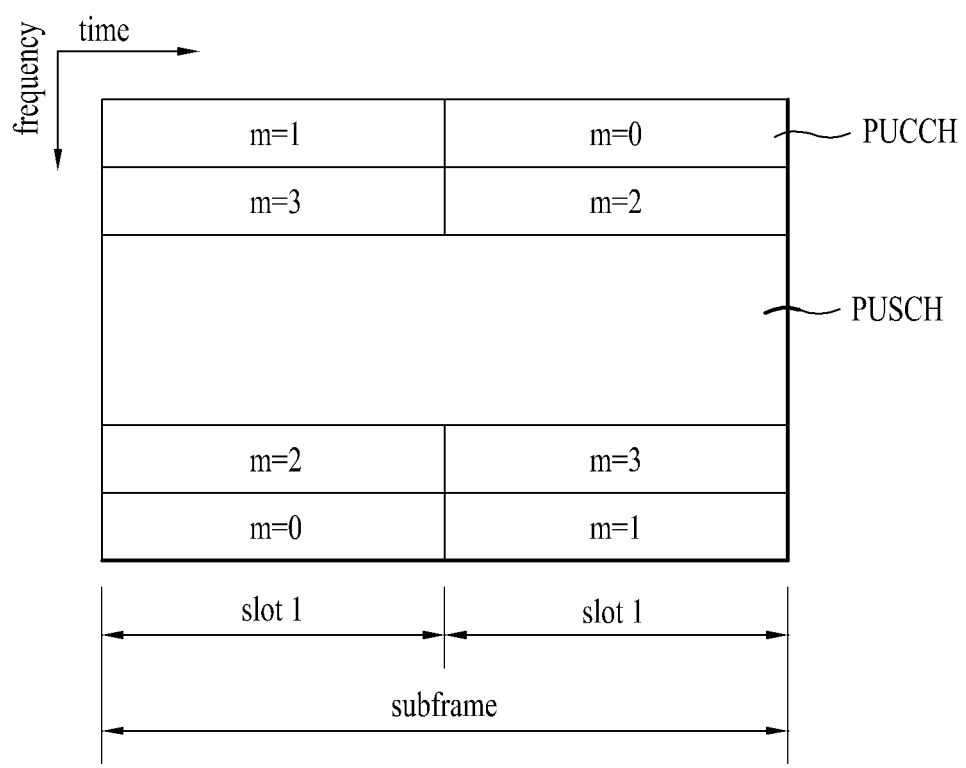
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
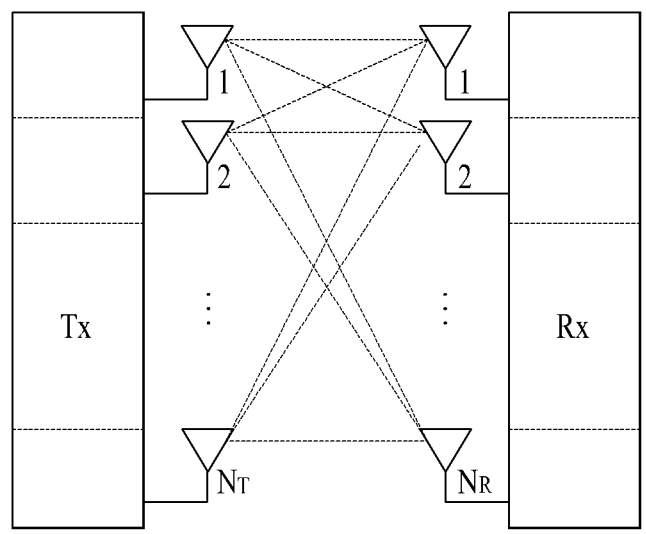
FIG. 7 is a block diagram of a general multi-antenna (MIMO) communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$X = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following, a reference signal is explained.

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both a transmitting end and the receiving end is transmitted and the channel information is found out with the extent of distortion when the signal is received on a channel. The signal known to both the receiving end and the transmitting end is called a pilot signal or a reference signal.

Recently, when a packet is transmitted, most of mobile communication systems intend to enhance transmission and reception efficiency by selecting multiple transmitting antennas and multiple receiving antennas instead of using a single transmitting antenna and a single receiving antenna. In case that a transmitting end or a receiving end intends to increase capacity or improve performance using multiple antennas, the transmitting end or the receiving end can receive a correct signal when a channel status between a transmitting antenna and a receiving antenna is known only. Hence, a separate reference signal should exist according to each transmitting antenna.

In a mobile communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like.

In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

LTE system defines two types of downlink RS for a unicast service. Specifically, one is a common RS (CRS) used for obtaining information on a channel status and performing measurement related to handover and the like and another is a dedicated RS (DRS) used for data demodulation. In this case, the CRS is also called a cell-specific RS and the DRS is also called a UE-specific.

In LTE system, the DRS is only used for the use of data demodulation and the CRS can be used for two purposes, i.e., obtaining channel information and performing data demodulation. The CRS is transmitted in every subframe over a wide band as a cell-specific reference signal. And, the CRS is transmitted based on maximum 4 antenna ports depending on the number of transmitting antenna of a base station. For instance, if the number of transmitting antenna of the base station corresponds to 2, the CRS for an antenna port 0 and the CRS for an antenna port 1 are transmitted. If the number of transmitting antenna of the base station corresponds to 4, the CRSs for an antenna port 0 to 3 are transmitted, respectively.

Figure 8:
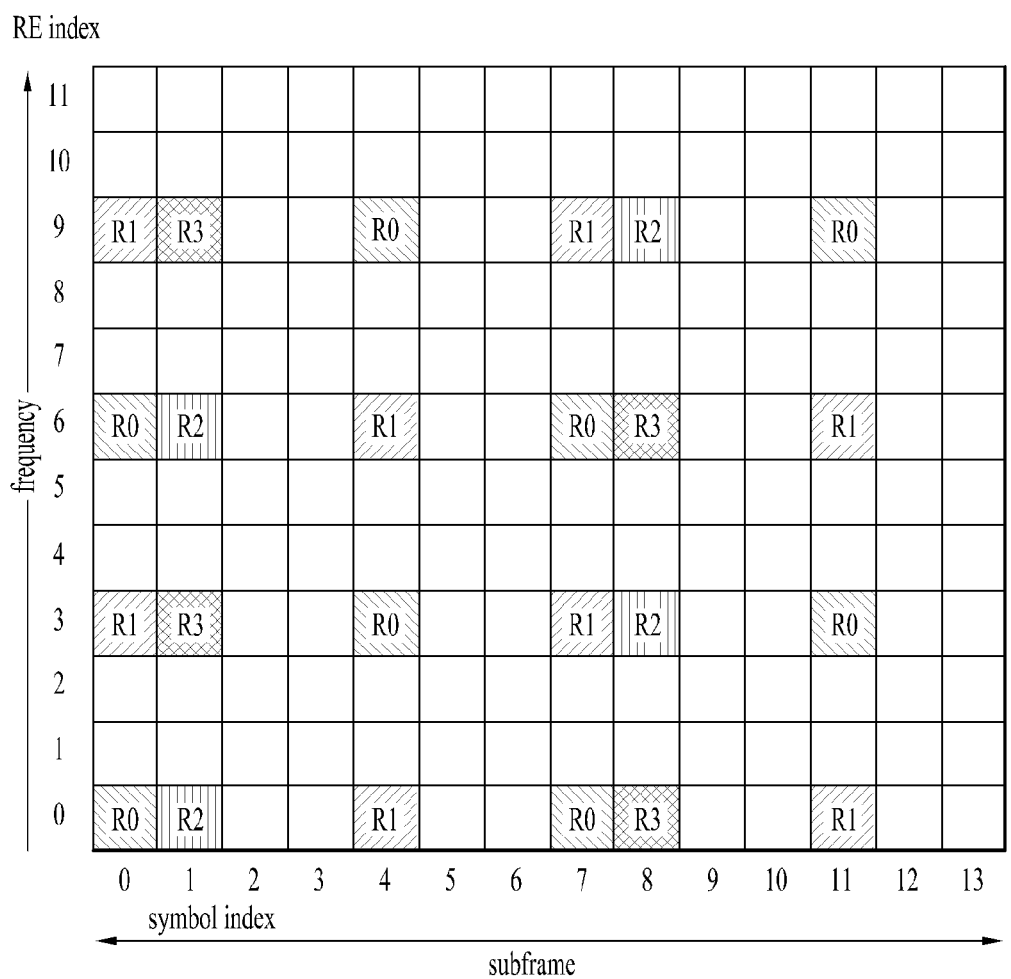
FIG. 8 is a diagram for an example of a general CRS pattern in case that there exist 4 transmission antennas in LTE system.

FIG. 8 is a diagram for an example of a general CRS pattern in case that there exist 4 transmission antennas in LTE system.

Referring to FIG. 8, if a CRS is mapped to a time-frequency resource in LTE system, a reference signal for one antenna port is transmitted in a manner of being mapped to one RE per 6 REs on a frequency axis. Since one RB includes 12 REs on the frequency, regarding RE for one antenna port, 2 REs are used per one RB.

Figure 9:
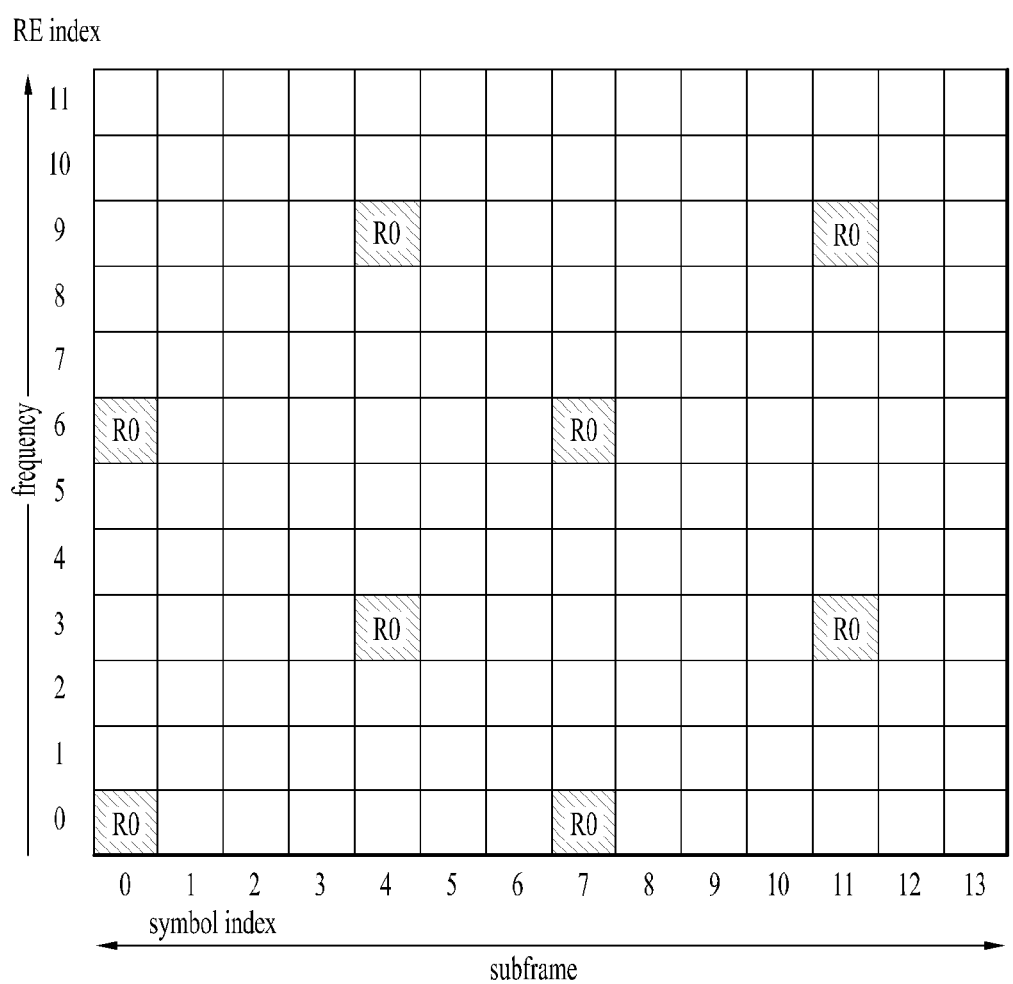
FIG. 9 is a diagram for an example of a CRS pattern for a transmission antenna port 0 in LTE system.

FIG. 9 is a diagram for an example of a CRS pattern for a transmission antenna port 0 in LTE system.

Meanwhile, in LTE-A system, which is an evolved version of LTE system, a base station should be designed to support maximum 8 transmitting antennas in DL. Hence, it is also necessary to support RS for the maximum 8 transmitting antennas.

Specifically, since a downlink RS is defined for maximum 4 antenna ports only in LTE system, if a base station includes more than 4 and maximum 8 DL transmitting antennas in LTE-A system, it is necessary to additionally define RS for the antenna ports. Regarding the RS for the maximum 8 transmitting antenna ports, it should consider both the RS used for channel measurement and the RS used for data demodulation.

One of the important considerations in designing LTE-A system is backward compatibility. The backward compatibility means to support a legacy LTE UE to properly operate in LTE-A system and the system should support the LTE UE as well. In terms of a transmission of an RS, RS for the maximum 8 transmitting antenna ports should be additionally defined in time-frequency domain where a CRC is transmitted. Yet, if a RS pattern for the maximum 8 transmitting antennas is added to whole band in every subframe in LTE-A system with a scheme such as the CRS of a legacy LTE system, RS overhead becomes considerably big.

Hence, a newly designed RS in LTE-A system can be mainly classified into two types. One is a channel state information RS (CSI-RS) used for a purpose of channel measurement to select a modulation and coding scheme (MCS), precoding matrix index (PMI), and the like. Another one is a demodulation RS (DM RS) used for a purpose of demodulating data transmitted via the maximum 8 transmitting antennas.

Unlike the CRS in the legacy LTE system used for the purpose of demodulating data as well as measuring for channel estimation, handover, and the like, the CSI-RS used for the purpose of channel measurement is mainly designed for the purpose of measuring for channel estimation. Unlike the CRS in the legacy LTE system, since the CSI-RS is transmitted to obtain information on a channel state only, it is not necessary to transmit the CSI-RS in every subframe. According to a current LTE-A standard, the CSI-RS can be assigned to an antenna port 15 to 22 and CSI-RS configuration information is received via an upper layer signaling.

And, for data demodulation, a DM RS as a dedicated reference signal is transmitted to a UE in which data transmission is scheduled in a corresponding time-frequency domain. In particular, the DM RS transmitted to a specific UE can be transmitted to a region in which the UE is scheduled, i.e., time-frequency domain to which data on the UE is transmitted only.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B transmits a reference signal to the user equipment to obtain channel state information from the user equipment and then commands the user equipment to feedback the channel state information measured based on the reference signal on Physical Uplink Control Channel (PUCCH) or Physical Uplink Shared Channel (PUSCH).

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

Obtaining an additional multi-user diversity using a multi-user MIMO (MU-MIMO) is added to a more advanced communication system such as LTE-A standard. Since interference between user equipments, which are multiplexed in an antenna domain, exists in MU-MIMO, accuracy of the CSI may deeply affect the interference of multiplexed different user equipment as well as the user equipment reporting the CSI. Hence, a more accurate CSI report is required in MU-MIMO compared to SU-MIMO.

To this end, LTE-A standard determined the last PMI to be designed in a manner of dividing into a W1 and a W2. The W1 indicates a long term and/or a wideband PMI and the W2 indicates a short term and/or a sub-band PMI.

As an example of a hierarchical codebook transformation scheme configuring one last PMI from the W1 and W2 information, a long-term covariance matrix of a channel can be used as shown in Formula 8 as follows.

$$W = \text{norm}(W1\,W2) \quad \text{[Formula 8]}$$

In the Formula 8, W2 corresponds to a codeword of a codebook configured to reflect short term channel information as a short term PMI, W corresponds to a codeword (in other word, a precoding matrix) of a last codebook, and norm(A) means a matrix that a norm of each row of matrix A is normalized to 1.

Detail structure of a legacy W1 and W2 is represented by Formula 9 as follows.

$$W1(i) = \begin{bmatrix} X_i & 0 \\ 0 & X_i \end{bmatrix}, \quad \text{[Formula 9]}$$

where $X_i$ is $Nt/2$ by $M$ matrix.

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\ columns} \text{ (if rank} = r),$$

where $1 \leq k, l, m \leq M$ and $k, l, m$ are integer.

In this case, $N_t$ indicates the number of transmission antenna. And, M corresponds to the number of columns in a matrix $X_i$ and indicates that a total M number of candidate column vectors exist in the matrix $X_i$. $e_M^k$, $e_M^l$, and $e_M^m$ are column vectors where $k^{th}$, $l^{th}$, and $m^{th}$ element is 1 and the rest of elements is 0 among m number of elements and indicate $k^{th}$, $l^{th}$, and $m^{th}$ column vectors in the matrix $X_i$. $\alpha_j$, $\beta_j$, and $\gamma_j$ correspond to complex values having a unit norm, respectively. In case of sorting out $k^{th}$, $l^{th}$, and $m^{th}$ column vectors in the matrix $X_i$, $\alpha_j$, $\beta_j$, and $\gamma_j$ indicate that a phase rotation is applied to the $k^{th}$, $l^{th}$, and $m^{th}$ column vectors. 'i' is an integer equal to 0 or greater than 0 and indicates a PMI index indicating the W1. 'j' is an integer equal to 0 or greater than 0 and indicates the PMI index indicating the W2.

In Formula 9, a structure of a codeword uses a cross polarized antenna. In case that a space between antennas is dense, for instance, if a distance between neighboring antennas is less than a half of a signal wavelength in general, the structure is a structure designed in a manner of reflecting a correlation characteristic of a generated channel. In case of the cross polarized antenna, an antenna can be classified into a horizontal antenna group and a vertical antenna group. Each antenna group has a characteristic of a uniform linear array (ULA) and two antenna groups are co-located.

Hence, the correlation between antennas of each group has a characteristic of an identical linear phase increment and the correlation between the antenna groups has a characteristic of a phase rotation. Consequently, since a codebook is a value resulted from a channel quantization, it is necessary to design the codebook by reflecting the characteristic of a channel as it is. For clarity of explanation, a rank 1 codeword designed by the aforementioned structure can be represented as Formula 10 as follows.

$$W1(i) * W2(j) = \begin{bmatrix} X_i(k) \\ \alpha_j X_i(k) \end{bmatrix} \quad \text{[Formula 10]}$$

According to the above Formula 10, a codeword is represented by a vector of the number $N_T \times 1$ of transmission antennas, is structuralized by a upper vector $X_i(k)$ and a lower vector $\alpha_j X_i(k)$, and the upper and lower vector show the correlation characteristic of the horizontal antenna group and the vertical antenna group, respectively. It is better to represent the $X_i(k)$ as a vector having a characteristic of linear phase increment by reflecting the correlation characteristic between antennas of each group. As a representative example, a DFT matrix can be used.

And, for a CoMP transmission scheme, a more accurate CSI report is required compared to a general case. In case of a joint processing (CoMP-JP), since a plurality of base stations cooperatively transmit an identical data to a specific user equipment, it can be theoretically regarded as a MIMO system where antennas are geographically distributed. Hence, in case of performing MU-MIMO in the joint processing (CoMP-JT) scheme, an accurate CSI report is required to avoid interference between user equipment, which are scheduled together. Due to an identical reason, a precise CSI report is required for a cooperative scheduling/beamforming scheme as well. Hence, one embodiment of the present invention proposes to precisely measure interference of a neighboring cell in the CoMP transmission scheme to make the CSI report to be more precisely reported.

If what is proposed by the present invention is explained in more detail, a UE measures interference data to calculate CSI and accurately corrects the measured interference data. One embodiment of the present invention may correspond to the CoMP transmission scheme, by which the present invention may be non-limited. In case of calculating the CSI in the CoMP transmission environment, it is necessary for the UE to measure interference from remaining cells except interference coming from a part or all CoMP cells participating in the cooperation.

In the following description, a cell participating in a CoMP operation is used as a common name of a base station, a cell, an antenna port, an antenna port group, an RRH (remote radio head), a transmission point (TP), a reception point (RP), an access point (AP) and the like. And, such a terminology as a cell is mainly used in the following description. And, in order to clearly indicate an entity participating in a downlink CoMP operation for a specific UE, such a terminology as a TP may be used as well.

A UE firstly estimates an interference data via a specific resource (cell) designated by a base station. If an estimated value is different from an interference data, which is practically necessary for calculating the CSI, the interference data can be corrected by a method specified by the present invention. In order to explain what is proposes by the present invention, a general method proposed to measure an interference data is firstly explained in the following description.

Figure 10:
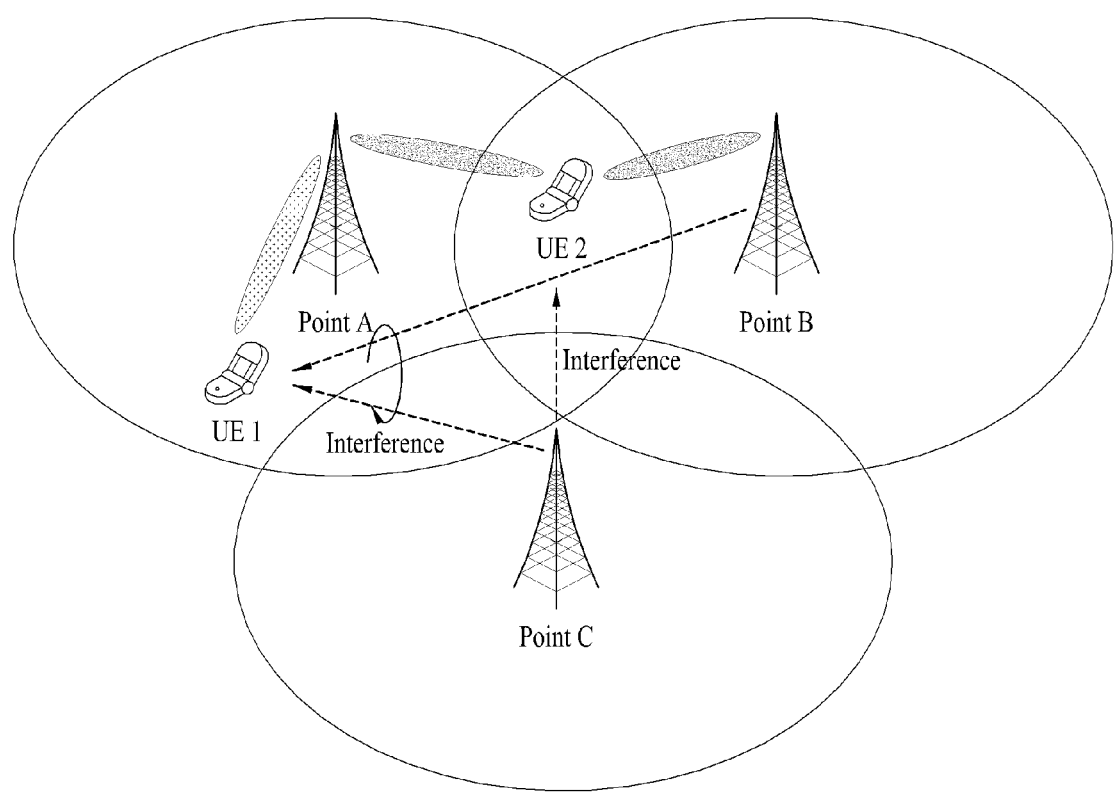
FIG. 10 is a diagram for one example of a method of measuring interference by a general method of the present invention.

FIG. 10 is a diagram for one example of a method of measuring interference by a general method of the present invention. According to a recently discussing trend, in CoMP situation, a base station designates a muting RE (resource element) in which transmit power of a part or all TPs is set to 0 to a UE and the UE estimates interference data from a signal received via the muting RE. In the following, a method of measuring the interference data via the muting RE is described with reference to FIG. 10 to FIG. 11c.

Referring to FIG. 10, a TP A to a TP C affect a UE 1 and a UE 2 to which CoMP transmission schemes different from each other are applied, respectively. In this case, a CoMP transmission scheme may change according to a channel state of each UE or a network state. Assume that the UE 1 is transceiving data with the TP A only since the CoMP transmission scheme is not applied to the UE 1. Hence, the UE 1 intends to measure interference from the remaining TP B and the TP C except the TP A corresponding to the TP transceiving data with the UE 1. Assume that the UE 2 is transceiving data according to a joint processing transmission scheme where the TP A and the TP B are cooperating with each other. Hence, the UE 2 intends to measure interference from the remaining TP C except the TP A and the TP B corresponding to the TPs transceiving data with the UE 2.

In this circumstance, the TP A can provide the UE 1 with an interference measurement zone, which corresponds to one zone used for measuring an interference signal, among downlink resource region transmitted to the UE 1. The UE 1 can measure strength of the interference signal using data received via the interference measurement zone among the downlink resource region received from each of the TPs.

In an example of FIG. 10, the TP A can configure the interference measurement zone for the UE 1. A signal received from the TP A is muted and signals received from both the TP B and the TP C are not muted in the interference measurement zone. This is because the UE 1 intends to exclude the signal received from the TP A only to measure interference from the TP B and the TP C.

Similarly, the TP A or the TP B can configure a different interference measurement zone for the UE 2. A downlink signal received from the TP A and the TP B is muted and a downlink signal received from the TP C may not be muted in the interference measurement zone configured for the UE 2. This is because the UE 2 intends not to mute the signal received from the TP C to measure interference from the TP C. As mentioned in the foregoing description, interference can be measured by applying an appropriate muting configuration to each UE according to a CoMP transmission scheme of the each UE in a manner of configuring an independent interference measurement zone according to the each UE. The interference measurement zone which is configured according to the each UE is called a UE-specific interference measurement zone.

In case of assigning an interference measurement zone according to a UE, since an appropriate muting configuration can be provided to a CoMP transmission scheme of each UE, precise measurement can be performed in an interference environment. Hence, it will be unnecessary to perform a separate correction for a value of interference measured in the aforementioned environment.

Figure 11B:
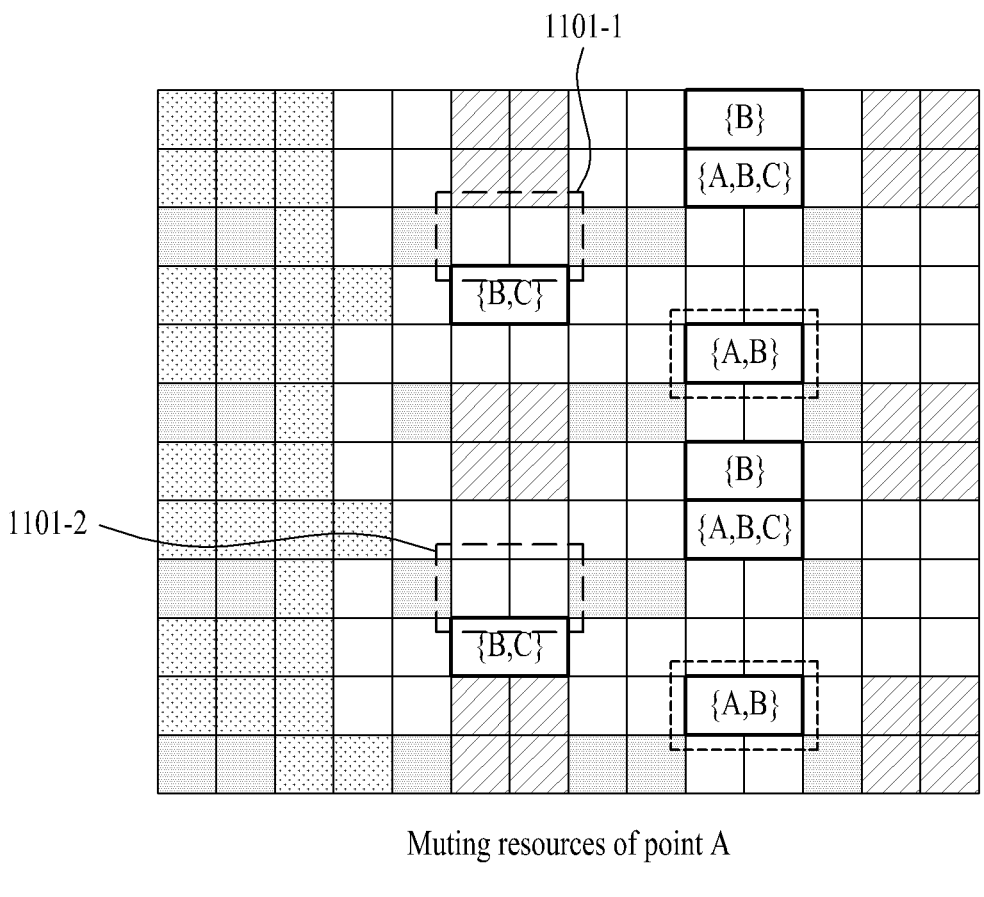
FIG. 11b is a diagram for second example of configuring a UE-specific interference measurement zone among resource region received from each TP.
Figure 11C:
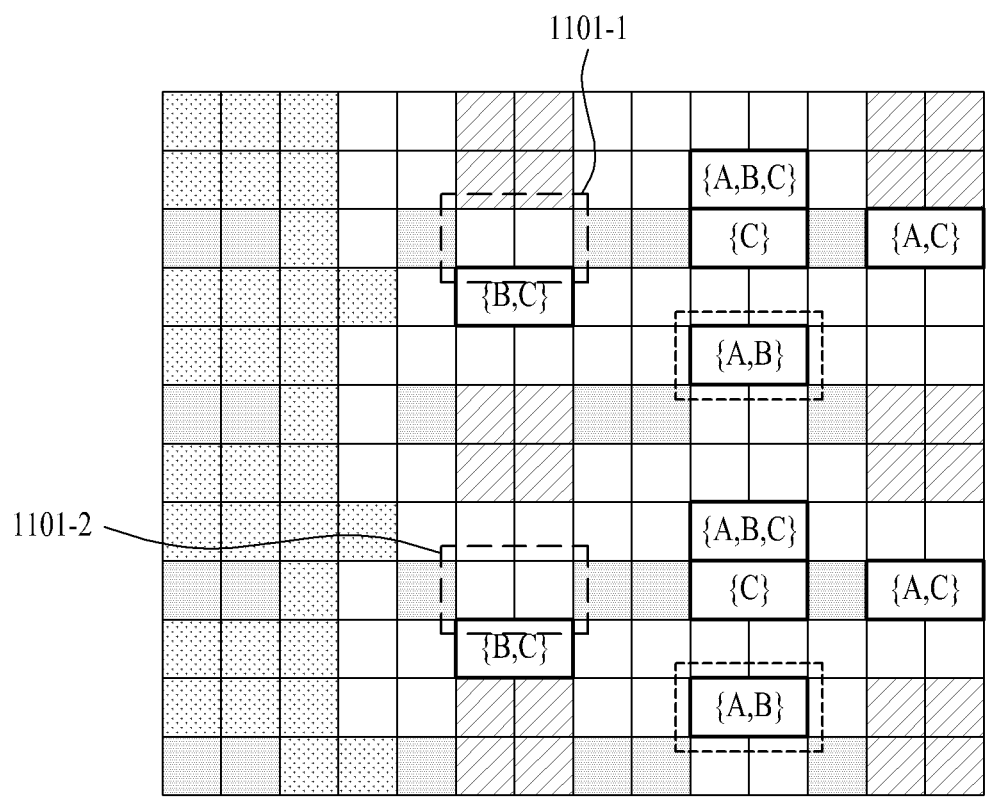
FIG. 11c is a diagram for third example of configuring a UE-specific interference measurement zone among resource region received from each TP.

FIGS. 11a to 11c are diagrams for one example of configuring a UE-specific interference measurement zone among resource region received from each TP. FIGS. 11a to 11c show downlink resource regions received from a TP A to a TP C, respectively. A muted TP is represented by a box in black color in each resource region. In the following description, when an example for a downlink resource region depicted in FIGS. 11a to 11c are explained, if a muted signal is received via one region of the resource region, it may mean to transmit the signal in a manner of muting the signal by a TP transmitting the signal.

For instance, FIG. 11a shows a downlink resource region received from the TP A. Among the resource region, a muted signal is represented by a box in black color. And, a TP muted together with the signal is indicated in the inside of the black box. In particular, the muted signal is identically received from a position of the downlink resource region received from the TP which is indicated together with the muted signal.

For instance, a muted signal is received from the TP A in positions of two RE pairs 1101-1/1101-2 and "{A}" is indicated in the inside of the RE pairs. In this case, it indicates that the signal received from the TP A is muted only in the positions corresponding to the two RE pairs 1101-1/1101-2. In particular, signals, which are not muted, are received in positions corresponding to the two RE pairs 1101-1/1101-2 of a resource region received from the TP B and the TP C (refer to FIG. 11b and FIG. 11c).

Similarly, a muted signal is received in an RE pair indicated by "{A, B, C}" which is received from the TP A. And, a muted signal is also received in an RE pair of an identical position among a resource region received from the TP B and the TP C.

Hence, in a circumstance depicted in FIG. 10, since the UE 1 intends to measure interference from the TP B and the TP C only, the UE 1 measures interference in an environment in which the TP A is muted only. In particular, in case of measuring interference using data received from 1101-1 and 1101-2 among the resource regions depicted in FIG. 11a to FIG. 11c, the interference can be measured in the environment in which the signal from the TP A is muted.

Similarly, in the circumstance depicted in FIG. 10, since the UE 2 intends to measure interference from the TP C only, interference can be measured using data received in the 1101-1 and 1101-2 corresponding to a region in which data received from the TP A and the TP B are muted.

Meanwhile, as mentioned in the foregoing description, in case of following a scheme of separately configuring an interference measurement zone according to each UE, a base station can inform a UE of a position of a configured interference measurement zone via a control channel. In this case, if the number of TPs participating in CoMP increase, a position of the interference measurement zone should be configured according to the increased number of TPs. Hence, if the number of TPs increase, an overhead inevitably occurs in a signal used for muting and/or a control signal used for signaling the interference measurement zone. Hence, although configuration of the UE-specific interference measurement zone has a merit in that interference is measured in a more precise environment, an overhead may occur in a signal used for configuring muting.

As an alternative method for reducing the overhead according to the UE-specific interference measurement zone, it may use a method of configuring a cell-specific interference measurement zone. In this case, all UEs belonging to a specific cell measure interference via an identical RE. All TPs belonging to the specific cell transmit a muted signal via the RE. By doing so, since it is sufficient to mute only one CSI-RS, resource overhead can be minimized. If it is explained with reference drawings depicted in FIG. 11a to FIG. 11c, if a CSI-RS resource indicated by "{A, B, C}" is muted only, all signals received from the three TPs can be muted.

So far, the pros and cons of the UE-specific interference measurement zone and the cell-specific interference measurement zone are explained. FIG. 12 is a table summarizing the pros and cons for a scheme of the UE-specific interference measurement zone and a scheme of the cell-specific interference measurement zone. In particular, according to the scheme of the cell-specific interference measurement zone, since interference is measured without considering a detail situation of each UE, it may need a process of correcting a result of the interference measurement. One embodiment of the present invention intends to propose a method of precisely correcting the result of the interference measurement.

Figure 13:
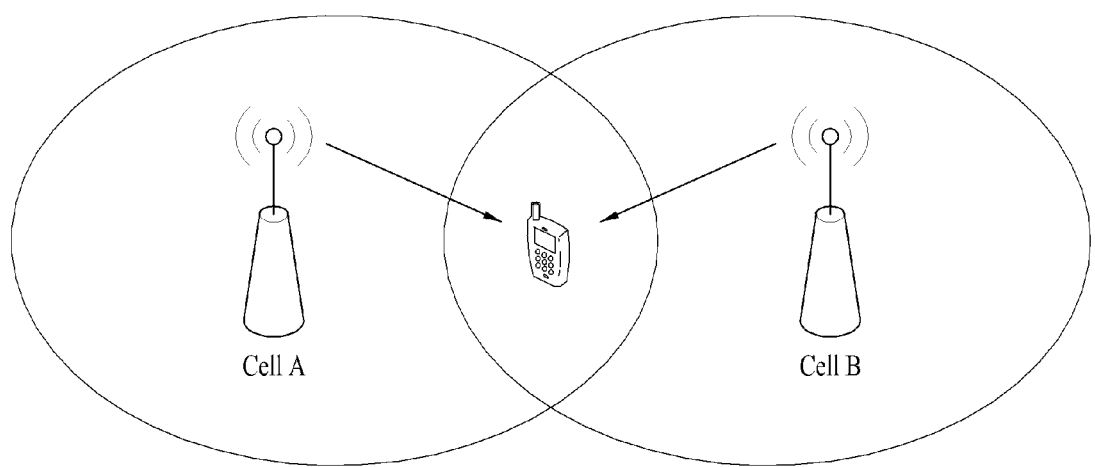
FIG. 13 is a diagram showing a coordinated communication performed by an A cell and a B cell for a CoMP UE.

FIG. 13 is a diagram showing a coordinated communication performed by an A cell and a B cell for a CoMP UE. In this case, the CoMP UE may have different interference data to be estimated according to a CoMP scheme.

For instance, in case of a DPS scheme, it is necessary to measure interference received from all cells except the A cell and interference received from all cells except the B cell, respectively. In case of measuring the interference received from all cells except the A cell, preferred interference can be measured via "{A}" region depicted in FIG. 11a to FIG. 11c. In case of measuring the interference received from all cells except the B cell, preferred interference can be measured via "{B}" region depicted in FIG. 11a to FIG. 11c.

In case of a DPS muting scheme or a JT scheme, a UE should measure strength of an interference data signal received from all cells except the A and B cell and preferred interference can be measured via "{A, B} region depicted in FIG. 11a to FIG. 11c.

Referring to an example depicted in FIG. 13, since a geographical position of a UE corresponds to the middle of the A cell and the B cell, interference is measured using data received via "{A}", "{B}" or "{A, B}". Referring to a different example, if the geographical position of the UE corresponds to the middle of the A cell and the C cell, interference can be measured using data received via "{A}", "{C}" or "{A, C}".

As mentioned in the foregoing description, TPs to be considered may vary according to the geographical position of the UE. The TPs to be considered are called a CoMP measurement set in the following description. In particular, in an example of FIG. 13, the CoMP measurement set can be configured with the TP A and the TP B.

In the following, in order to explain one embodiment of the present invention, one or more base stations used for considering interference are represented as a base station group in the present specification and claims. It is apparent that one base station can belong to the base station group only.

A type of an interference signal varies according to each UE. In order to appropriately reflect the interference signal in accordance with a situation of each UE, the UE-specific interference measurement zone scheme can be utilized. Yet, as mentioned in the foregoing description, when the UE-specific interference measurement zone scheme is configured, overhead of a PDSCH resource may occur.

Hence, one embodiment of the present invention proposes a method of configuring a common interference muting set. And, if it is determined that there exists a difference between an interference data signal measured via the common interference muting set and an interference data signal necessary for calculating CoMP CSI, one embodiment of the present invention proposes a method of correcting the difference of the interference. According to one embodiment of the present invention, in case of measuring the interference data signal from the configured interference muting set, it may use a muting RE shown in FIG. 11a to FIG. 11c. For instance, if the TP A, the TP B and the TP C are configured as the interference muting set, interference strength can be measured by data received via an RE indicated by "{A, B, C}" among the downlink resource region depicted in FIG. 11a to FIG. 11c. Hence, a network signals to a UE for a position of the RE and the UE measures the interference strength in the position of the signaled RE. By doing so, the interference strength for the configured interference muting set can be measured.

The UE receives a muted signal from all TPs included in the interference muting set. The interference strength measured via the muted signal may correspond to strength of interference from the remaining TPs except the TP included in the interference muting set. In the following, the remaining TPs except the TP included in the interference muting set is called a first base station group and the interference signal strength received from the first base station group is called a first interference strength.

If the UE intends to obtain strength of interference in consideration of the TP 1 included in the interference muting set, the strength of interference can be compensated in a manner of adding the strength of the interference data signal from the TP 1 to the strength of the interference data signal measured from the first base station group. On the contrary, if the UE intends to obtain strength of interference in consideration of the TP 2 not included in the interference muting set, the strength of interference can be compensated in a manner of extracting the strength of the interference data signal received from the TP 2 from the strength of the interference data signal measured from the first base station group. As mentioned in the foregoing description, a target base station used for correcting the interference data signal measured from the first base station group is called a second base station group. And, strength of an interference signal received from the second base station group is called a second interference strength.

As a prerequisite for the aforementioned operation, it is necessary to independently estimate an interference data signal received from a single or a plurality of TPs (from the second base station group). According to one embodiment of the present invention, information necessary for independently estimating the interference data signal received from a single or a plurality of the TPs is explained in the following.

(1) RS of each TP (2) PDSCH to RS power ratio (3) rank of interference data and PMI information (4) traffic load A base station may signal to a UE for the aforementioned information (1) to (4).

In the following, each of the information is sequentially explained in detail.

(1) RS (Reference Signal) of Each TP

A UE according to one embodiment of the present invention uses a CRS or a CSI-RS as an RS to estimate an interference data signal. In this case, a base station may inform the UE of configuration information of the RS. The UE estimates an interference channel from a specific TP using the RS and then measures strength of an interference data signal received from the specific TP based on the interference channel. In order to calculate the strength of the interference data signal from information on the estimated channel, it may additionally need the aforementioned (2) PDSCH to RS power ratio, (3) rank of interference data and PMI information and (4) traffic load. A method of utilizing each of the aforementioned information is continuously explained.

(2) PDSCH to RS Power Ratio

In general, an RS is transmitted with higher power compared to PDSCH to enable all UEs within coverage of a cell to stably receive the RS. Hence, a UE should estimate strength of an interference data signal in a manner of reflecting PDSCH to RS power ratio in strength of an interference channel estimated via the RS. If transmit power of PDSCH is less than transmit power of RS, it is preferable to estimate the strength of the interference data signal in a manner of being less than the strength of the received RS.

(3) Rank of Interference Data and PMI Information

Strength of an interference data signal received by a UE may vary according to a rank of an interference data and PMI information. In particular, an interference effective channel (a size of a value of which an interference channel is multiplied by a precoding matrix) varies according to a correlation between a singular vector of an interference channel and PMI and reception power of an interference data signal received on the interference effective channel varies. Hence, the UE should know the rank of the interference data and the PMI information to precisely measure the strength of the interference data signal.

Having received the rank of the interference data and the PMI information from a base station, the UE estimates an interference effective channel in a manner of multiplying PMI with an interference channel measured from an RS. Reception power of the interference data signal, which is pre-coded by the PMI, is measured in a manner of reflecting PDSCH to RS power ratio in the strength of the interference effective channel.

Meanwhile, in case of transmitting the rank of the interference data and the PMI information according to one embodiment of the present invention, one embodiment of the present invention proposes to transmit the rank of the interference data and the PMI information on PDCCH of low latency. This is because since scheduling of the UE is dynamically achieved, it is preferable to transmit the rank of the interference data and the PMI information according to the scheduling of the UE without latency. Moreover, in order to avoid overhead occurred on the PDCCH, one embodiment of the present invention may add limitation on a rank and PMI information set capable of using a neighboring TP for a specific time. By doing so, the neighboring TP selects a rank and PMI from a limited set and the UE takes an average of interference effective channel of all PMIs within the limited set and determines it as a final interference effective channel.

(4) Traffic Load

Impact of interference given by a specific TP to a UE may vary according to a traffic load. In particular, if a traffic load from the specific TP is not big, since interference intermittently occurs, the UE may reduce a size of an interference data signal in a manner of reflecting the traffic load.

As mentioned in the foregoing description, according to one embodiment of the present invention, information including the aforementioned (1) to (4) can be delivered on PDCCH. And, according to a different embodiment of the present invention, the information including the aforementioned (1) to (4) can also be delivered via such a higher layer signal as an RRC. Along with the aforementioned signal, a base station can inform the UE of a signal (correction type indication information) indicating whether to add or subtract strength of interference received via a specific TP via a control signal. For instance, the base station can inform the UE that strength of an interference data signal, which is estimated from an RS of a TP 1, is added to strength of an interference data signal measured from an interference muting set and strength of an interference data signal, which is estimated from an RS of a TP 2, is extracted from the strength of the interference data signal measured from the interference muting set via bitmap signaling and the like. Regarding this, it shall be explained in more detail in the following description.

Referring back to FIG. 10, assume that the TP A has designated the TP A, the TP B and the TP C to the UE 2 as an interference muting set. In particular, assume that remaining cells except the TP A, the TP B and the TP C are configured as the aforementioned first base station group. Hence, in this case, the UE 2 measures interference received from the remaining cells (first base station group) except the TP A, the TP B and the TP C included in the interference muting group. In this case, the measured interference may have the aforementioned first interference strength.

In this case, the TP A may signal to the UE 2 for designating an RE indicated by "{A, B, C}" shown in FIG. 11a to FIG. 11c and may measure strength of an interference signal based on data received via the designated RE.

Subsequently, in order to measure strength of an interference data signal received from the remaining cells except the A and B cell to calculate CSI, strength of an interference data signal from the TP C (second base station group) can be added to strength of interference measured via the interference muting set. In particular, assume that the TP C is configured as the second base station group. In this case, since the TP C, which is the second base station group, is not included in the first base station group, it may need a correction of adding interference signal strength.

In particular, a base station may signal to the UE for more consideration of the strength of the interference signal from the TP C and signal to the UE for a signal (correction type indication information) indicating whether to perform an adding correction. In this case, the UE estimates a channel from an RS received from the TP C, more considers the aforementioned (1) to (4) for the estimated value and may be then able to estimate strength (second interference strength) of an interference data received from a final TP C. As mentioned in the foregoing description, if the strength of the interference data received from the TP C is estimated, the strength can be added to the strength of the interference measured via the interference muting set. And, the added value may correspond to strength of interference of which the strength of the interference signal received from the TPs except the interference muting set and the strength of the interference signal received from the TP C are considered together.

In order to explain a different example, referring to FIG. 10 again, assume that the TP A has designated the TP A only to the UE 2 as an interference muting set. In particular, assume that remaining cells except the TP A are configured as the first base station group.

In this case, the UE 2 can measure interference received from the remaining TPs except the TP A. In this case, the TP A may signal to the UE 2 for designating an RE indicated by "{A}" shown in FIG. 11a to FIG. 11c and may measure strength (first interference strength) of an interference signal based on data received via the designated RE.

Subsequently, it may need strength of interference data signal received from the remaining cells except the TP A and the TP B. In particular, assume that the TP B is configured as the second base station group. In this case, since the TP B, which is the second base station group, is included in the first base station group, it may need a correction of subtracting interference signal strength.

In particular, a base station may signal to the UE for more consideration of the strength of the interference signal from the TP B and signal to the UE for a signal (correction type indication information) indicating whether to perform an subtracting correction.

By doing so, the strength of the interference data signal received from the remaining cells except the TP A and the TP A can be estimated in a manner of extracting a size of the interference data received from the TP B from the strength of the interference data measured using the interference muting set. In this case, interference channel from the TP B can be estimated using an RS received from the TP B. After estimating the channel from the TP B using the RS, the UE more considers the aforementioned (1) to (4) for the estimated channel and may be then able to estimate strength (second interference strength) of an interference data signal received from the TP B. If the strength of the interference data received from the TP B is estimated, the strength of the interference signal estimated from the TP B can be subtracted from the strength (i.e., interference strength of the first base station group) of the interference measured via the interference muting set. The estimated value may correspond to strength of interference of which the strength of the interference signal received from the TP B is subtracted from the strength of the interference signal received from the remaining TPs except the interference muting set.

Figure 14:
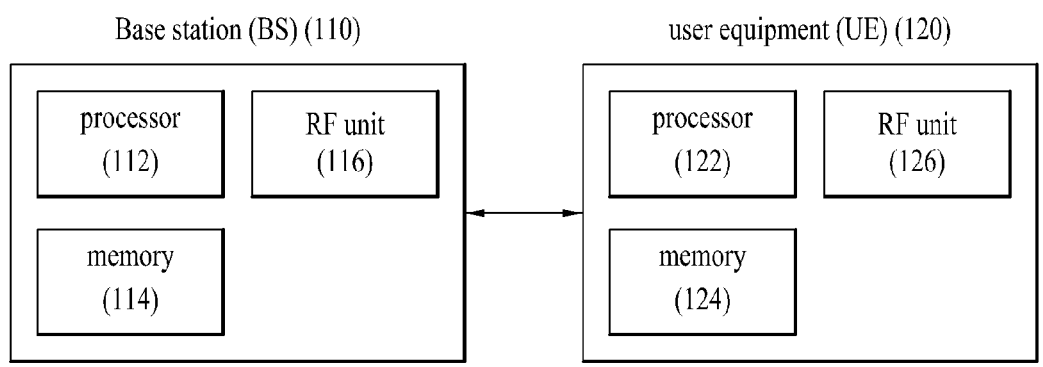
FIG. 14 is a diagram for a base station and a user equipment applicable to one embodiment of the present invention.

FIG. 14 is a diagram for a base station and a user equipment applicable to one embodiment of the present invention. If a relay is included in a wireless communication, a communication in backhaul link is performed between the base station and the relay and a communication in access link is performed between the relay and the user equipment. Hence, the base station or the user equipment shown in the drawing can be replaced by the relay in accordance with a situation.

Referring to FIG. 14, a wireless communication system includes a base station (BS) 110 and a user equipment (UE) 120. The base station 110 includes a processor 112, a memory 114 and a radio frequency (RF) module 116. The processor 112 can be configured to implement a procedure and/or methods proposed by the present invention. The memory 114 is connected with the processor 112 and stores various information related to operations of the processor 112. The RF unit 116 is connected with the processor 112 and transmits and/or receives a radio signal. The user equipment 120 includes a processor 122, a memory 124 and a radio frequency (RF) module 126. The processor 122 can be configured to implement a procedure and/or methods proposed by the present invention. The memory 124 is connected with the processor 122 and stores various information related to operations of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting channel state information in a wireless communication system and apparatus therefor are described with reference to examples applied to 3GPP LTE system, it may be applicable to various kinds of wireless communication systems as well as to the 3GPP LTE system.

What is claimed is:

1. A method of measuring strength of an interference signal, which is measured by a user equipment in a wireless communication system, the method comprising:
measuring first interference strength corresponding to the strength of the interference signal received from a first base station group;
calculating second interference strength corresponding to the strength of the interference signal received from a second base station group;
receiving correction type indication information indicating either a correction of subtracting the second interference strength from the first interference strength or a correction of adding the second interference strength to the first interference strength from a network; and
correcting the first interference strength using the second interference strength according to the correction type indication information.

2. The method of claim 1, wherein if the second base station group belongs to the first base station group, the correction type indication information indicates the correction of subtracting the second interference strength from the first interference strength.

3. The method of claim 1, wherein if the second base station group does not belong to the first base station group, the correction type indication information indicates the correction of adding the second interference strength to the first interference strength.

4. The method of claim 1, wherein the measuring the first interference strength is performed on an RE (resource element) which is configured to measure interference of the first base station group.

5. The method of claim 4, wherein the RE configured to measure the interference of the first base station group corresponds to an RE in which one or more base stations containing the first base station perform muting.

6. The method of claim 1, wherein the calculating the second interference strength further comprises:
receiving an RS (reference signal) from the base station; and
measuring strength of the received RS.

7. The method of claim 6, wherein the calculating the second interference strength further comprises:
receiving a PDSCH (physical downlink shared channel) to RS power ratio information from the base station; and
calculating the second interference strength based on the received power ratio information and the strength of the measured RS.

8. The method of claim 6, wherein the calculating the second interference strength further comprises:
receiving a rank of a data received from the base station and PMI (precoding matrix index) information;
calculating a size of an interference effective channel based on the strength of the measured RS and the received rank and PMI information; and
calculating the second interference strength based on the size of the interference effective channel.

9. The method of claim 6, wherein the calculating the second interference strength further comprises:
receiving traffic load information of the base station from the base station; and
calculating the second interference strength based on the strength of the measured RS and the traffic load information.

10. A user equipment measuring strength of an interference signal in a wireless communication system, comprising:
a wireless communication module configured to transceive a signal with base stations; and
a processor configured to access the wireless communication module and configured to control an operation of the user equipment,
wherein the processor is further configured to:
measure first interference strength corresponding to the strength of the interference signal received from a first base station group,
calculate second interference strength corresponding to the strength of the interference signal received from a second base station group,
receive correction type indication information indicating either a correction of subtracting the second interference strength from the first interference strength or a correction of adding the second interference strength to the first interference strength from a network, and
correct the first interference strength using the second interference strength according to the correction type indication information.

11. The user equipment of claim 10, wherein if the second base station group belongs to the first base station group, the correction type indication information indicates the correction of subtracting the second interference strength from the first interference strength.

12. The user equipment of claim 10, wherein if the second base station group does not belong to the first base station group, the correction type indication information indicates the correction of adding the second interference strength to the first interference strength.

13. The user equipment of claim 10, wherein the first interference strength is measured on an RE (resource element) which is configured to measure interference of the first base station group.

14. The user equipment of claim 13, wherein the RE configured to measure the interference of the first base station group corresponds to an RE in which one or more base stations containing the first base station perform muting.

15. The user equipment of claim 10, wherein the processor is further configured to receive an RS (reference signal) from the base station and configured to measure strength of the received RS when the second interference strength is calculated.

16. The user equipment of claim 10, wherein the processor is further configured to receive a PDSCH (physical downlink shared channel) to RS power ratio information from the base station and configured to calculate the second interference strength based on the received power ratio information and the strength of the measured RS when the second interference strength is calculated.

17. The user equipment of claim 15, wherein the processor is further configured to receive a rank of a data received from the base station and PMI (precoding matrix index) information, configured to calculate a size of an interference effective channel based on the strength of the measured RS and the received rank and PMI information and configured to calculate the second interference strength based on the size of the interference effective channel when the second interference strength is calculated.

18. The user equipment of claim 15, wherein the processor is further configured to receive traffic load information of the base station from the base station and configured to calculate the second interference strength based on the strength of the measured RS and the traffic load information when the second interference strength is calculated.

\* \* \* \* \*